UNITED STATES PATENT OFFICE.

SAMUEL WITHERS, OF PHILADELPHIA, PENNSYLVANIA.

MARBLEIZING METAL, CHINA, &c.

SPECIFICATION forming part of Letters Patent No. 505,303, dated September 19, 1893.

Application filed April 18, 1892. Serial No. 429,659. (Specimens.)

*To all whom it may concern:*

Be it known that I, SAMUEL WITHERS, a citizen of the United States, residing in the city and county of Philadelphia, State of Pennsylvania, have invented a new and useful Improvement in Marbleizing and Granitizing Stone, Metal, China, Crockery, Tile, &c., which improvement is fully set forth in the following specification.
In carrying out my invention I take a material or article that has been enameled or glazed and fired and coat the same with a color which is ground in water or fermented liquor, sweet or sour, such as beer, vinegar, &c. I make a strong solution of soapsuds, sal-soda or other suitable alkali, and sprinkle, spray or splash it on the surface of the applied color while yet wet. The action of the alkali on the vinegar color causes the same to run in veins, thereby producing a marbleized appearance. The article as treated is then dried in an oven or other suitable place, after which it is heated to a high degree until the color is fused with the enamel or glaze, after which I apply if required a coat of enamel or glaze as a finish, the same being duly fired, it being seen that the product is of an attractive nature, its patterns being bright, durable, well defined and sharp.

Having thus described my invention, what I claim as new, and desire to secure by Letters Patent, is—

1. An improvement in marbleizing and granitizing metal, tile, delf, &c., consisting in applying to the surface of an enamel or glazed material or article, a color, formed of a pigment that has been ground in water or fermented liquor, sweet or sour, next sprinkling on the coating a solution of alkali, drying the article and firing the same until the color is fused with the enamel or glaze, and if required applying a coat of enamel or glaze as a finish, substantially as described.

2. An improvement in marbleizing and granitizing metal, tile, delf, &c., consisting in glazing the article to be marbleized, firing the same, coating it with a color formed of a pigment which has been ground in water or fermented liquor, sweet or sour, then applying an alkali thereon, and drying and firing the same, substantially as described.

SAMUEL WITHERS.

Witnesses:
JOHN A. WIEDERSHEIM,
A. P. JENNINGS.